(12) United States Patent
Arrobo Vidal et al.

(10) Patent No.: US 10,912,105 B2
(45) Date of Patent: Feb. 2, 2021

(54) APPARATUS, SYSTEM AND METHOD OF WIRELESS VIDEO STREAMING

(71) Applicant: INTEL CORPORATION, Santa Clara, CA (US)

(72) Inventors: Gabriel Arrobo Vidal, Hillsboro, OR (US); Vijay Sarathi Kesavan, Portland, OR (US); Maria Ramirez Loaiza, Beaverton, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 16/367,870

(22) Filed: Mar. 28, 2019

(65) Prior Publication Data

US 2019/0223194 A1    Jul. 18, 2019

(51) Int. Cl.
| | |
|---|---|
| *H04W 72/12* | (2009.01) |
| *H04N 21/4363* | (2011.01) |
| *H04N 21/647* | (2011.01) |
| *H04N 21/262* | (2011.01) |
| *H04W 80/02* | (2009.01) |
| *H04W 8/24* | (2009.01) |
| *H04N 21/4402* | (2011.01) |
| *H04N 21/845* | (2011.01) |

(52) U.S. Cl.
CPC .. *H04W 72/1226* (2013.01); *H04N 21/26216* (2013.01); *H04N 21/43637* (2013.01); *H04N 21/44029* (2013.01); *H04N 21/647* (2013.01); *H04N 21/8456* (2013.01); *H04W 8/24* (2013.01); *H04W 80/02* (2013.01)

(58) Field of Classification Search
CPC . H04W 72/02; H04W 72/04; H04W 72/1226; H04W 8/24; H04W 80/02; H04N 21/26216; H04N 21/43637; H04N 21/44029; H04N 21/647; H04N 21/8456
See application file for complete search history.

(56) References Cited

U.S. PATENT DOCUMENTS

| | | | | |
|---|---|---|---|---|
| 2002/0089994 A1* | 7/2002 | Leach, Jr. | ........... | H04L 47/2433 370/412 |
| 2012/0307747 A1* | 12/2012 | MacInnis | .......... | H04W 72/1242 370/329 |

(Continued)

OTHER PUBLICATIONS

Linksys, "Internet Speed Today: The Evolution of Home Wi-Fi", retrieved from https://www.linsys.com/us/home-wifi-internet-speed-evolution/, Jan. 23, 2019, 16 pages.

(Continued)

*Primary Examiner* — Candal Elpenord
(74) *Attorney, Agent, or Firm* — Shichrur & Co.

(57) ABSTRACT

For example, an apparatus may include logic and circuitry configured to cause a wireless communication device to determine at least one video quality parameter representing an estimated quality of at least one video stream to be streamed via the wireless communication device to a display device over a wireless communication medium; to determine a scheduling policy parameter based at least on the video quality parameter; and to provide the scheduling policy parameter to a Media Access Control (MAC) scheduler to schedule wireless transmission of the at least one video stream to the display device.

23 Claims, 10 Drawing Sheets

(56) References Cited

U.S. PATENT DOCUMENTS

| | | | | |
|---|---|---|---|---|
| 2013/0286879 A1* | 10/2013 | ElArabawy | ...... | H04N 21/26208 370/252 |
| 2014/0219088 A1* | 8/2014 | Oyman | ............... | H04L 65/1083 370/231 |
| 2014/0368734 A1* | 12/2014 | Hoffert | ................ | H04N 5/4403 348/564 |
| 2016/0088322 A1* | 3/2016 | Horev | ................ | H04N 21/8456 725/14 |
| 2017/0238322 A1* | 8/2017 | Sen | ......................... | H04W 4/18 370/329 |
| 2018/0160160 A1* | 6/2018 | Swaminathan | ....... | H04L 65/605 |

OTHER PUBLICATIONS

Keysight, "1XChariot—Instant performance assessment of complex networks in pre and post deployment", retrieved from https://www.ixiacom.com/products/ixchariot, Jan. 2019, 3 pages.

Devin K. Akin, "Client Density and Video Performance Comparison of Mid-range 802.11ac Access Points", Divergent Dynamics, Version1.00, Sep. 2017, 18 pages.

Zhi Li et al., "Streaming Video over HTTP with Consistent Quality", MMSys '14 Proceedings of the 5th ACM Multimedia Systems Conference, Mar. 19, 2014, pp. 248-258, 11 pages.

Qualcomm, "Qualcomm Introduces StreamBooist Technology to Optimize Performance and Capacity of Home Networks", Jan. 4, 2013, retrieved from https://www.qualcomm.com/newskeleases/2013/01/04/qualcomm-introduces-streamboost-technology-optimize-performance-and, Jan. 23, 2019, 4 pages.

Wi-Fi Alliance, "Multi-AP Specification version 1.0", Jun. 18, 2018, 66 pages.

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

* cited by examiner

APPARATUS, SYSTEM AND METHOD OF WIRELESS VIDEO STREAMING

TECHNICAL FIELD

Embodiments described herein generally relate to wireless video streaming.

BACKGROUND

In one or more use cases, an AP may transmit a plurality of wireless streams to a plurality of users and/or devices.

In one example, the AP may transmit a first video stream to a wireless Television (TV), for example, to display a movie on the TV; a second video stream to a Smartphone, e.g., to display a video clip on the Smartphone, a third data stream to a laptop, e.g., to download an application to the laptop, and/or any other additional or alternative wireless streams to any other users and/or devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
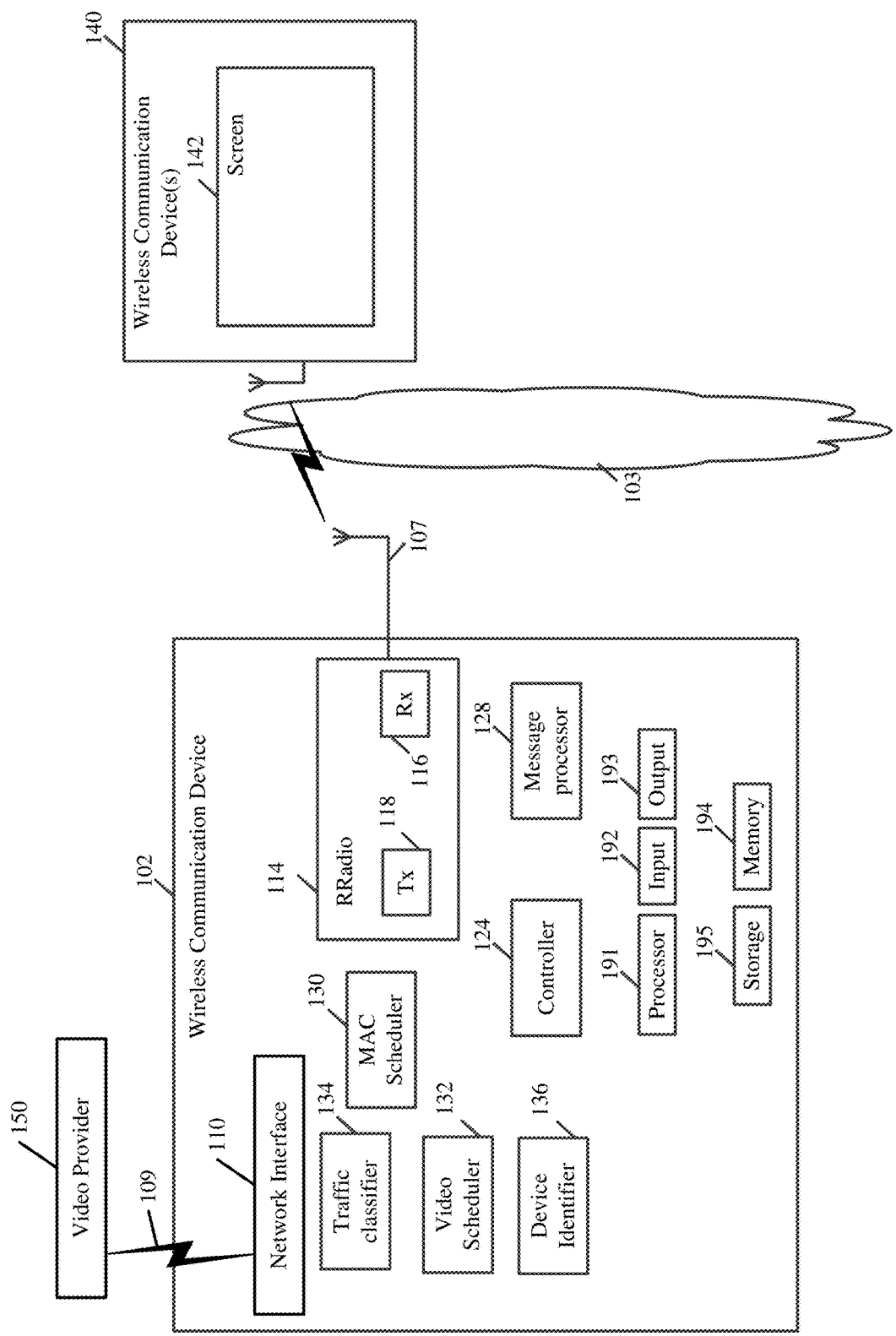
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016)) and/or future versions and/or derivatives thereof, devices and/or networks operating in accordance with existing WFA Multi-AP Specifications (Multi-AP Specification v1.0, 2018) and/or future versions and/or derivatives thereof, devices and/or networks operating in accordance with existing WFA Peer-to-Peer (P2P) specifications (WiFi P2P technical specification, version 1.7, Jul. 6, 2016) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication device 102, and/or at least one wireless communication device 140.

In some demonstrative embodiments, wireless communication device 102 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, device 102 and/or device 140 may include, operate as, and/or perform the functionality of, any other devices and/or STAs.

In some demonstrative embodiments, device 102 may include an access point (AP) STA.

In one example, device 102 may be configured to operate as, perform one or more operations of, and/or to perform the functionality of, an AP.

In some demonstrative embodiments, device 140 may be configured to operate as, and/or to perform the functionality of, a non-AP STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication device 102 may be capable of communicating content, data, information and/or signals via a wireless medium (WM) 103.

In some demonstrative embodiments, wireless medium 103 may include, for example, a radio channel, a channel, a cellular channel, a Global Navigation Satellite System (GNSS) Channel, an RF channel, a WiFi channel, an IR channel, and the like.

In some demonstrative embodiments, wireless communication medium 103 may include a 2.4 GHz frequency band, and/or one or more other wireless communication frequency bands, for example, a 5 GHz frequency band, a millimeter-Wave (mmWave) frequency band, e.g., a 60 GHz frequency band, a Sub-1 GHz (S1G) band, and/or any other frequency band.

In some demonstrative embodiments, devices 102 and/or 140 may include one or more radios including circuitry and/or logic to perform wireless communication between devices 102, 140 and/or one or more other devices. For example, device 102 may include at least one radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, radio 114 may be configured to communicate over a 2.4 GHz band and/or any other band.

In some demonstrative embodiments, radio 114 may include, or may be associated with, one or more antennas.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include a controller 124. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative embodiments, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In some demonstrative embodiments, at least part of the functionality of controller 124 may be implemented as part of one or more elements of radio 114.

In other embodiments, the functionality of controller 124 may be implemented as part of any other element of device 102.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128, respectively. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, device 102 and/or device 140 may form, or may communicate as part of, a wireless local area network (WLAN).

In some demonstrative embodiments, device 102 and/or device 140 may form, or may communicate as part of, a WiFi network.

In other embodiments, device 102 and/or device 140 may form, and/or communicate as part of, any other additional or alternative network.

In some demonstrative embodiments, device 140 may include a display device configured to display video content from at least one video provider 150.

For example, device 140 may include a Television (TV), a Smartphone, a Tablet, a wireless display, or the like.

In some demonstrative embodiments, video provider 150 may include a video source, e.g., a web camera, or a video streaming service provider, e.g., YouTube, Netflix, and the like.

In some demonstrative embodiments, device 140 may include a screen 142 to display the video content.

In some demonstrative embodiments, device 102 may be configured to stream the video content from the video provider 150 to display device 140, for example, over WM 103.

In some demonstrative embodiments, device 102 may include a network interface 110 configured to receive the video content from video provider 150 via a communication network 109.

In some demonstrative embodiments, network interface 110 may be implemented using any suitable hardware components and/or software components, for example, processors, controllers, memory units, storage units, input units, output units, communication units, operating systems, and/or applications.

In some embodiments, network interface 110 may be implemented as part of any suitable module, system, device, or component of device 102.

In one example, network interface 110 may be implemented, for example, as middleware, and/or as part of any suitable application of device 102. For example, interface 110 may be implemented as part of an application of device 102 and/or as part of an OS of device 102.

In some demonstrative embodiments, network interface 110 may include a Network Interface Card (NIC). In other embodiments, network interface 110 may include any other interface.

In some demonstrative embodiments, communication network 109 may include a wired network, a wireless network, or any combination of a wired and a wireless network.

In one example, communication network 109 may include the Internet. In another example, communication network may include any other network.

In some demonstrative embodiments, device 102 may be configured to stream video content to a plurality of display devices 140, for example, from one or more video providers 150, e.g., from a plurality of video providers 150.

In some demonstrative embodiments, device 102 may be configured to stream video content and/or data traffic to a plurality of display devices 140 and/or wireless communication devices, e.g., as described below.

In some demonstrative embodiments, device 102 may include a MAC scheduler 130 (also referred to as a "WiFi/MAC scheduler") configured to schedule wireless transmission of the video content and/or data traffic to the plurality of display devices 140 and/or the wireless communication devices.

In one example, MAC scheduler 130 may be configured to schedule a first video stream to be transmitted from device 102 to a first display device 140, e.g., a wireless Television (TV), for example, to display a movie on the TV; to schedule a second video stream to be transmitted from device 102 to a second display device 140, e.g., a Smartphone, e.g., to display a video clip on the Smartphone; to schedule a data stream to be transmitted from device 102 to a laptop, e.g., to download an application to the laptop; and/or to schedule any other additional or alternative data traffic or video traffic to be transmitted from device 102 to any other users or devices.

A survey of home WiFi usage shows that about fifty percent of home users may stream movies and/or TV shows on multiple devices at the same time. With a growth of online streaming video content, this trend may continue to expand, for example, if the users are moving from consuming video content from service providers (SPs), e.g., cable TV providers and/or Video-On-Demand (VOD) providers, to consuming the video content from video streaming services (also referred to as "Over-The-Top (OTT) streaming services"), e.g., Netflix, YouTube, and the like.

In some demonstrative embodiments, a User Experience (UX) for video streaming may include more than uninterrupted streaming, e.g., without buffering, and artifact-free video. End users may expect, for example, even when being mobile, to watch video streaming at a highest possible resolution, e.g., supported by a content of the video streaming and/or by a consuming device of the video streaming.

In some demonstrative embodiments, it may be beneficial to prioritize streaming or transmissions of video content from the video streaming services to display devices, e.g., as described below.

In one example, WiFi APs provided by SPs may have one or more mechanisms to prioritize SP video streaming content. However, there may be limited mechanisms or even no mechanisms, for example, to prioritize video content from video streaming services, e.g., from the OTT streaming services. For example, retail APs may not have mechanisms to prioritize video content either from SPs or OTT streaming services. The OTT video streaming services may implement proprietary mechanisms, e.g., at an application-layer, for example, to identify video degradation and/or to adapt to it.

In some demonstrative embodiments, there may be one or more inefficiencies, disadvantages and/or technical problems when using one or more adaptive streaming techniques to adapt streaming of video traffic, e.g., as described below.

In one example, a Moving Picture Experts Group (MPEG) Dynamic Adaptive Streaming over HTTP (DASH) (MPEG-DASH) technique may include an adaptive bitrate streaming technique for high quality streaming media content, which may be used by multiple OTT streaming services, e.g., YouTube, Netflix, and the like. The MPEG-Dash technique may be standardized. However, an OTT streaming service, e.g., each OTT streaming service, may implement one or more algorithms, e.g., one or more proprietary algorithms, for example, to detect and/or react to network conditions, e.g., to adjust a video streaming quality, for example, which may provide an enhanced viewing experience. The one or more algorithms of the OTT streaming services may be implemented at an application layer and/or may take into consideration end-to-end network conditions.

In some demonstrative embodiments, simulations of a home wireless network may demonstrate that the adaptive streaming techniques have one or more inefficiencies, disadvantages and/or technical problems, e.g., as described below.

For example, a simulation of a home WiFi network including a plurality of wireless devices running a plurality of applications, for example, DASH video streaming applications, file transfer applications, web browsing applications, Voice over IP (VoIP) applications, and the like, may measure user experience metrics for the plurality of applications. The simulation may be based on a first assumption that a WiFi AP does not have a mechanism to identify an application-level traffic and/or to prioritize between traffic flows, therefore, the WiFi AP may handle all the traffic flows "equally". The simulation may be based on a second assumption that there may be no network congestion, e.g., in the rest of the Internet.

Figure 2:
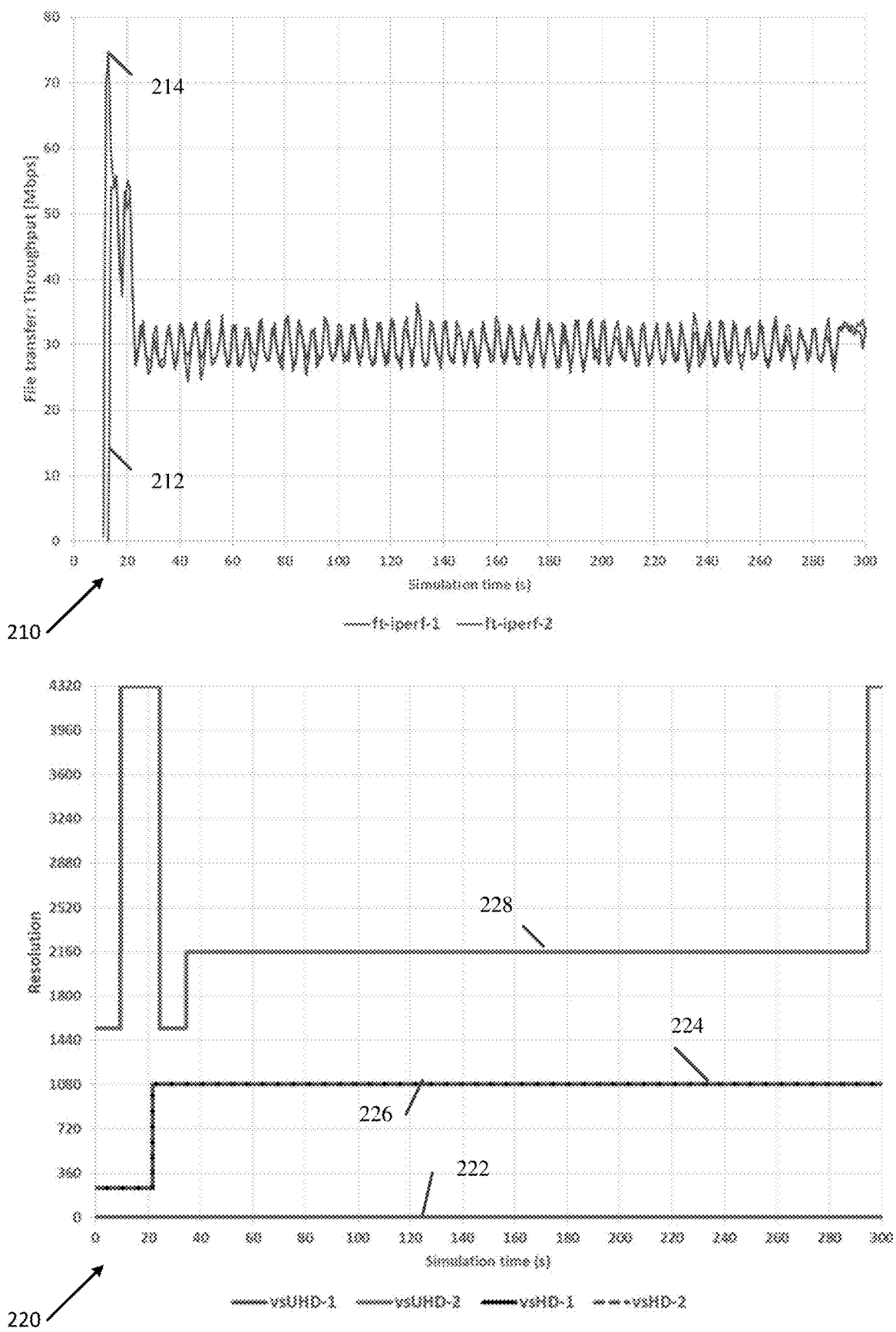
FIG. 2 is a schematic illustration of a first graph and a second graph depicting simulation results to illustrate technical problems, which may be addressed in accordance with some demonstrative embodiments.

Reference is made to FIG. 2, which schematically illustrates a first graph 210 and a second graph 220 depicting simulation results to illustrate technical problems, which may be addresses in accordance with some demonstrative embodiments.

In one example, the simulation may include 15 STAs connected to an AP. A STA may execute a single application, for example, an Ultra High Definition (UHD) video streaming application, a voice application, a videoconference application, a file transfer application, a gaming application, a web browsing application, or any other application.

The simulation may include one or more video streaming applications, for example, a video streaming UHD application, which requests content of up to 8K resolution, e.g., a 7680×4320 resolution, and/or a video streaming High Definition (HD) application, which requests content of up to Full High Definition (FHD), e.g., a 1920×1080 resolution.

The simulation may include unlimited bandwidth in an Internet connection or link, e.g., the Internet connection may not be a bottleneck.

As shown in FIG. 2, graph 210 depicts throughputs of two file transfer applications over time, e.g., a first throughput 212 of a first file transfer application, and a second throughout 214 of a second file transfer application.

As shown in FIG. 2, graph 220 depicts resolutions of four video streaming applications over time, e.g., first resolutions of a first video streaming application 222, second resolutions 224 of a second video streaming application, third resolutions 226 of a third video streaming application, and/or fourth resolutions 228 of a fourth video streaming application.

As shown in FIG. 2, throughput for the file transfer applications may be almost constant throughout the simulation run, while the resolutions for the video streaming applications may be adapted.

As shown in FIG. 2, first video streaming application 222 did not have a chance to start streaming from a beginning of the simulation, e.g., the resolution of the first video streaming application 222 remains zero.

In some demonstrative embodiments, using one or more adaptive streaming techniques for adaptation of a plurality of video streams competing over a limited bandwidth may have one or more inefficiencies, disadvantages and/or technical problems, e.g., as described below.

In some demonstrative embodiments, one or more lab tests may be analyzed to identify effects and/or technical problems of adaptation of video streams, for example, when using the one or more adaptive streaming techniques.

Figure 3:
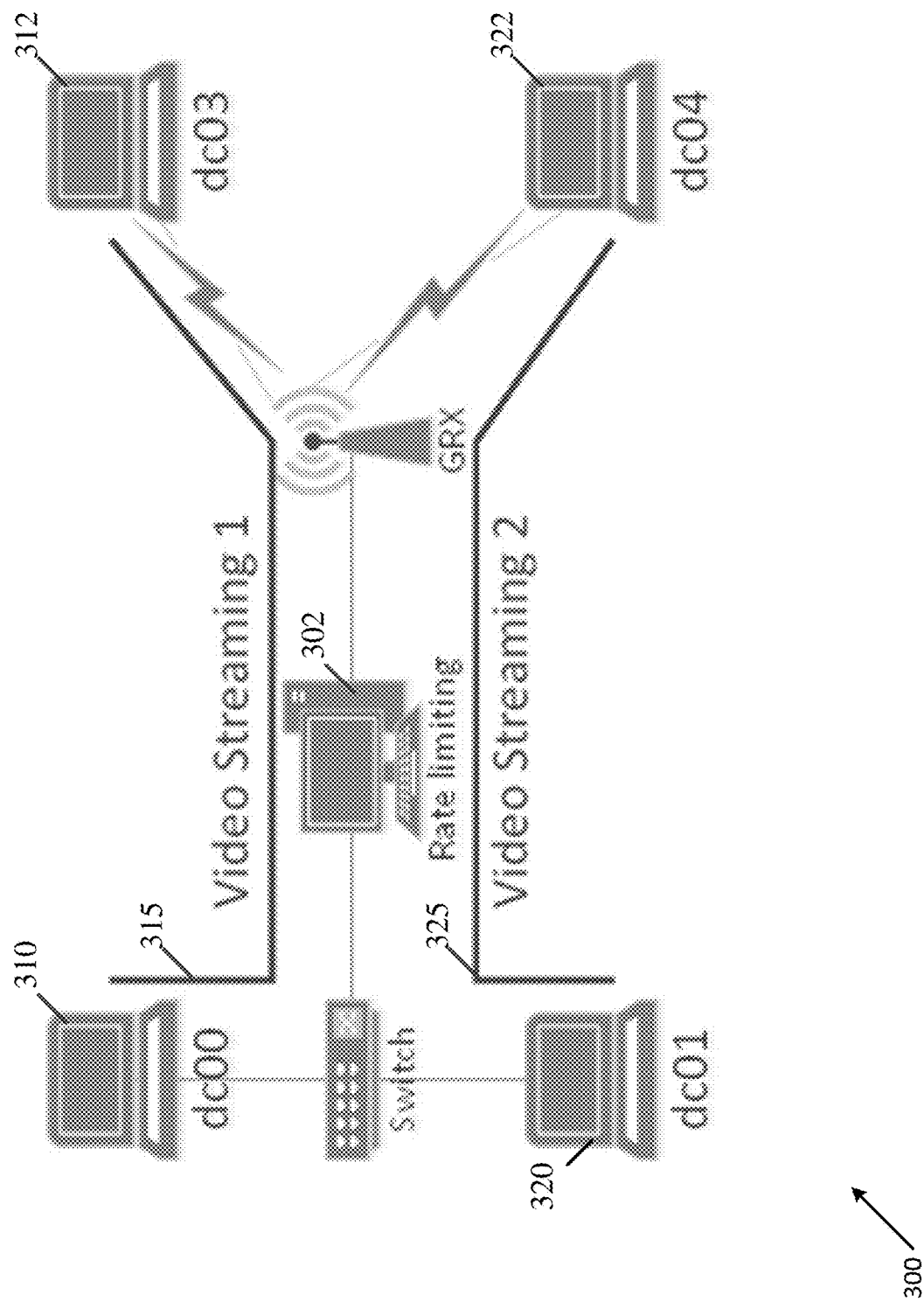
FIG. 3 is a schematic illustration of a configuration of a lab test to illustrate technical problems, which may be addressed in accordance with some demonstrative embodiments.

Reference is made to FIG. 3, which schematically illustrate a configuration 300 of a lab test to illustrate technical problems, which may be addressed in accordance with some demonstrative embodiments.

As shown in FIG. 3, the configuration may include a first video source 310, a second video source 320, a first display device 312, and a second display device 322.

As shown in FIG. 3, a wireless communication device 302 may be configured to stream video content 315 from video source 310 to display device 312, and/or to stream video content 325 from video source 320 to display device 322.

As shown in FIG. 3, wireless communication device 302 may have a limited bandwidth, for example, for wireless transmission of video content 325 and/or video content 315

In one example, video sources 310 and 320 may be identical, and display devices 312 and 322 may be identical. For example, video sources 310 and 320 and/or devices 312 and 322 may have a same manufacturer, a same model, a same hardware, a same OS, and/or the like.

One or more lab tests and/or experiments may be performed, for example, using configuration 300, for example, to verify a behavior and/or an adaptation of video streaming applications using a traffic generator.

Figure 4:
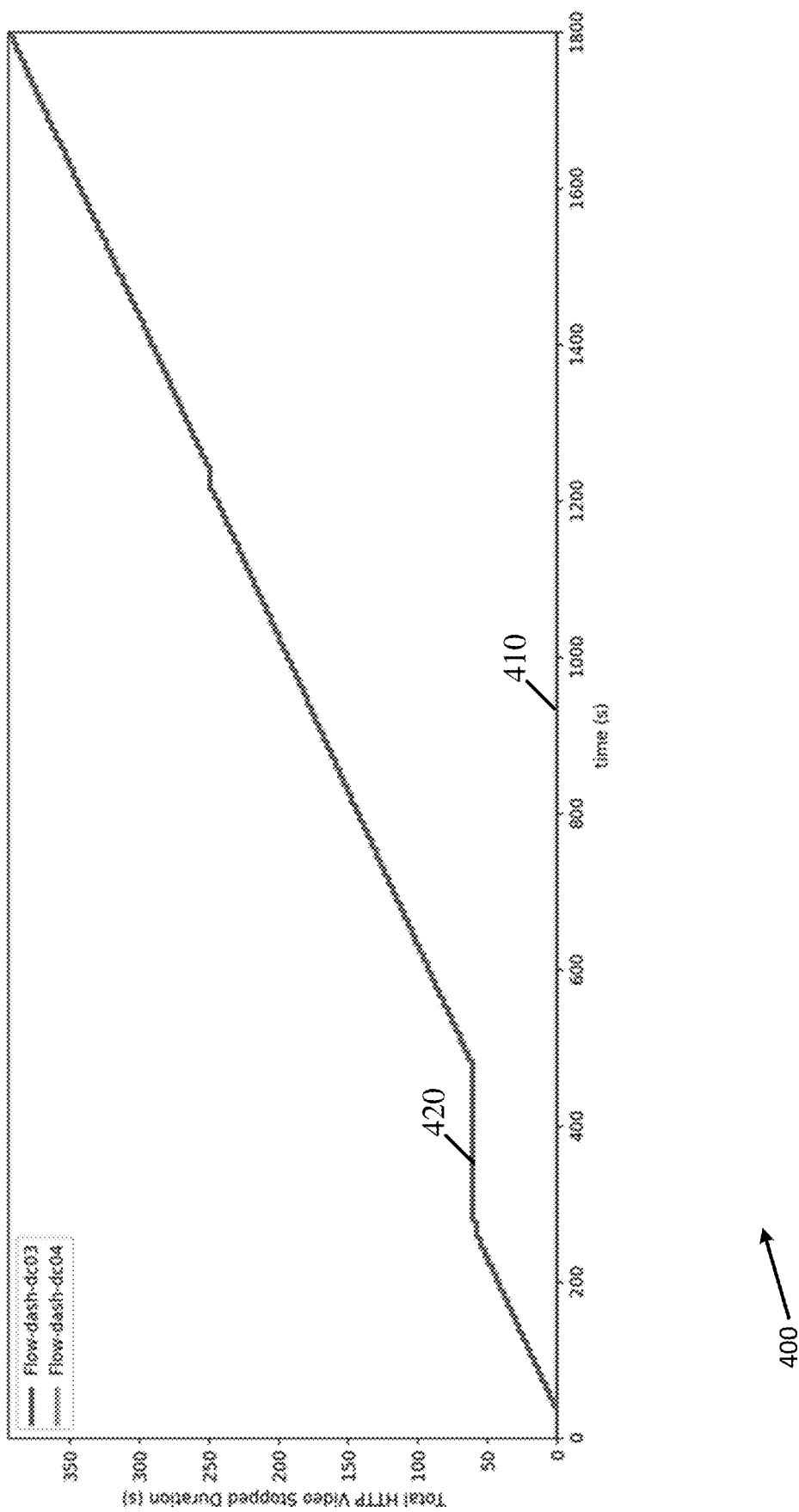
FIG. 4 is a schematic illustration of a graph depicting video stop durations over time for a first video application and a second video application to illustrate technical problems, which may be addressed in accordance with some demonstrative embodiments.

Reference is made to FIG. 4, which schematically illustrates a graph 400 depicting video stop durations 410 over time for a first video application, and video stop durations 420 for a second video application to illustrate technical problems, which may be addressed in accordance with some demonstrative embodiments.

In one example, graph 400 depicts simulation results of an experiment of 30 minutes running over configuration 300 (FIG. 3).

For example, the video application may stream video content 315 (FIG. 3) from video source 310 (FIG. 3) to display device 312 (FIG. 3); and the second video application may stream video content 325 (FIG. 3) from video source 320 (FIG. 3) to display device 322 (FIG. 3).

In one example, stop durations 410 and 420 may include times, e.g., cumulative times, that a video player stopped playing the video stream during the experiment.

As shown in FIG. 4, stop durations 420 of the second video application may be about seven minutes during the 30-minute period of the experiment, while the first video application did not stop at all during the experiment.

Figure 5:
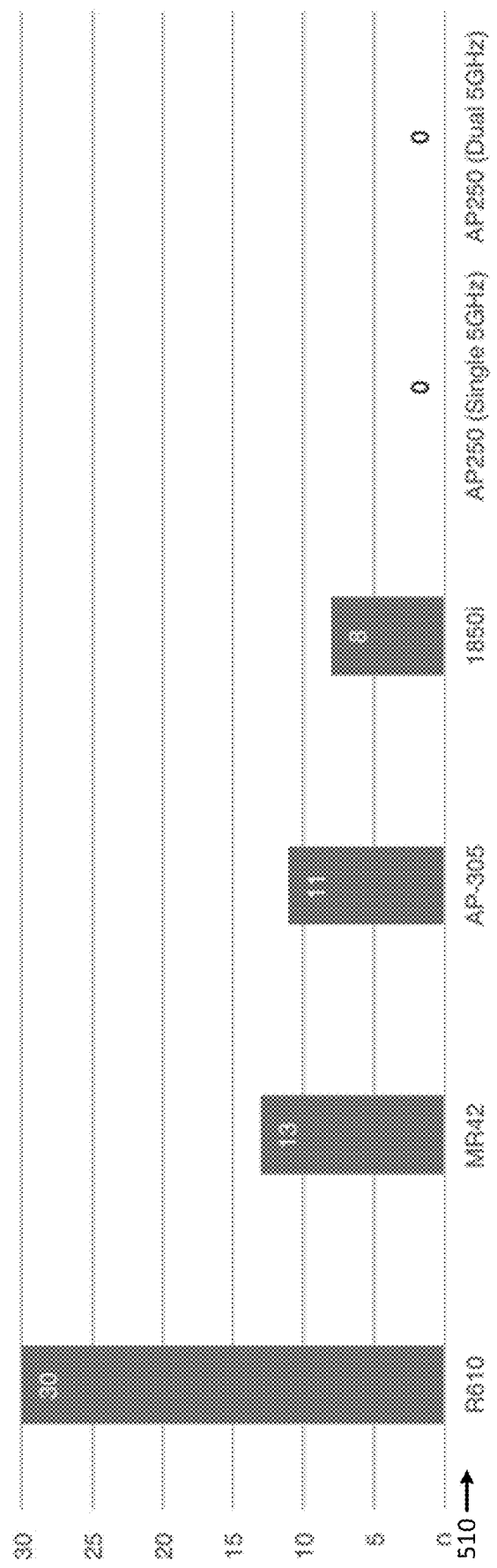
FIG. 5 is a schematic illustration of a graph depicting performance of a plurality of access points to illustrate technical problems, which may be addressed in accordance with some demonstrative embodiments.

Reference is made to FIG. 5, which schematically illustrates a graph 500 depicting performance of a plurality of access points 510 to illustrate technical problems, which may be addressed in accordance with some demonstrative embodiments.

In one example, graph 500 may be used to compare performance of the plurality of APs 510, for example, for each AP there may be multiple video streaming applications running in different STAs.

As shown in FIG. 5, almost all APs 510 may not be able to deliver stall-free video streaming, for example, when there are multiple applications running in the network.

In view of the above discussions with reference to FIGS. 2, 3, 4 and/or 5, there may be some challenges and/or technical problems, which may be addressed, for example, when using adaptive streaming techniques to stream a plurality of wireless transmissions.

In one example, when high BW applications, e.g., video-streaming applications, file transfer applications, video conference applications and/or the like, coexist in a same network, a quality across applications and/or across the devices may be affected. However, while a degradation in quality may be expected, a degradation of user experience metrics, e.g., stalls, artifacts, quality changes and the like, may be more pronounced for the video streaming applications, e.g., compared to user experience metrics for file transfer applications.

In another example, when a video stream contends with other applications and/or flows, e.g., non-video applications, a DASH application may adapt the video stream to a lower resolution until the other applications and/or streams complete, and/or their BW requirements drop. For example, if the competing flow includes an elastic flow, e.g., a file transfer application, the video stream may remain at a lower resolution until the file transfer completes.

In another example, in one or more scenarios and/or use cases, for example, when multiple video streams are being streamed simultaneously on multiple devices and the WiFi network is congested, the DASH application on every device may adapt the video, e.g., into a lower resolution. However, the adaptation may be independent of other devices. For example, a 4K-resolution video stream to be displayed on a large screen HD TV may be adapted prior to, or more aggressively, for example, compared to a 4K-resolution stream to be displayed on a small screen handheld device, e.g., a Smartphone, which may degrade a user experience.

For example, while an adaptation of the 4K-resolution stream to be displayed on the small screen to a lower resolution may not degrade a user experience, an adaptation of the 4K-resolution video stream to be displayed on the large screen HD TV to a lower resolution may significantly degrade the user experience.

In some demonstrative embodiments, in one or more use cases and/or scenarios usage of one or more IEEE802.11 standards, standards enhancements, or any other Standards, for example, to stream a plurality of wireless transmissions may have one or more inefficiencies, disadvantages and/or technical problems, e.g., as described below.

In one example, according to an IEEE802.11ax standard, an AP may be allowed to share its resources, for example, to serve multiple STAs simultaneously. The AP may try to maximize a utilization of its resources, for example, resource units, spatial streams, bandwidth, or any other resources, among all of the STAs for a given Transmission Opportunity (TxOP) time. However, the technical problems described above may not be solved, for example, as the IEEE802.11ax standard enhancements may not address these technical problems, for example, in terms of an appropriate quality of service (QoS), e.g., from a perspective of an application side. For example, a scheduler, e.g., MAC scheduler 130, may not be aware of an effect of distribution of its resources in a long term. For example, a video streaming player, e.g., a YouTube streaming player, may consider a network data rate, and/or a buffer availability, for example, to determine a video quality the video streaming player requests from the server. For example, if a network performance degrades, the video streaming player may use a low quality video resolution, such that the video buffer, e.g., a percentage of a loaded video, may be sustained.

In some demonstrative embodiments, in one or more use cases and/or scenarios, one or more approaches and/or applications, for example, to maintain video quality on wireless networks may have one or more inefficiencies, disadvantages and/or technical problems, e.g., as described below.

For example, using video rate adaptation and/or considering video variability may have one or more inefficiencies, disadvantages and/or technical problems, e.g., as described below.

For example, some applications may rely on providing priorities to certain traffic, however, the applications may not consider a type of device at which the traffic may be consumed, and/or how video applications, e.g., DASH streaming applications, may adapt their traffic.

In another example, the IEEE802.11ax Standard may include one or more features, e.g., multi-user (MU) transmissions, downlink (DL) or uplink (UL) OFDMA, DL/UL MIMO, which may increase usage of spectral resources. Therefore, the MAC scheduler 130 may be required to handle MU transmissions, e.g., per TxOP basis. However, the MAC scheduler 130 may not consider a QoS for the video applications, e.g., the DASH video applications, which require a long-term perspective, e.g., over several TxOP.

In another example, some video applications may require an access to a video content within a finite horizon, which may not be technically simple or even impossible.

In some demonstrative embodiments, device 102 may be configured to implement and/or support a two-tier scheduler architecture, e.g., as described below.

In some demonstrative embodiments, device 102 may be configured to implement and/or support a Long-Term Scheduler (LTS) which may influence a real-time scheduling by MAC scheduler 130, for example, to address the video streaming quality problem, e.g., as described below.

In some demonstrative embodiments, device 102 may be configured to implement and/or support a combination of the LTS and a Video Quality Identifier (VQI) (VQI-LTS), e.g., as described below.

In some demonstrative embodiments, the VQI-LTS may be configured to provide information about a long term performance (QoS) to the MAC scheduler 130, which may support MAC scheduler 130 to make better decisions in the use of its resources for the long term, e.g., as described below.

In some demonstrative embodiments, the VQI-LTS may be configured to support, for example, a wireless network, e.g., home WiFi networks or any other wireless networks, to use its resources and/or maximize a network performance in the long term, for example, by providing an adequate QoS to video streaming applications, e.g., as described below.

In some demonstrative embodiments, the VQI-LTS may provide one or more advantages, for example, over some adaptive streaming techniques. For example, if the MAC scheduler 130 does not have enough resources for a video streaming application in the long term, the video streaming application may decrease its resolution, which may free resources in the MAC scheduler 130, while the user may notice a decrease in a QoS. Therefore the VQI-LTS may support the MAC scheduler 130 with a long-term perspective for QoS of the users for video traffic, e.g., as described below.

In some demonstrative embodiments, the VQI-LTS may be configured to support, for example, an improved, or even an optimal, video streaming quality, e.g., as described below.

In some demonstrative embodiments, the VQI-LTS may be configured to sustain and/or increase a quality of streaming video, for example, even without causing network performance to be affected, e.g., as described below.

In some demonstrative embodiments, the VQI-LTS may be configured to detect a video traffic, to identify a current quality of the video traffic, and/or to maintain the quality, for example, by controlling scheduling priorities, e.g., of MAC scheduler 130, for example, in video streaming in a home network or any other network, e.g., as described below.

In some demonstrative embodiments, the VQI-LTS may be configured to attempt to increase a resolution of the video traffic and/or to modify short term scheduling policies, e.g., of the MAC scheduler 130, for example, if the wireless network is able to support a higher video quality with the current traffic conditions, e.g., as described below.

In some demonstrative embodiments, the VQI-LTS may be configured to support one or more video policies, for example, when processing a plurality of video streams, e.g., as described below.

In some demonstrative embodiments, the VQI-LTS may be configured to support a uniform quality policy, according to which the VQI-LTS treats all of the plurality of video streams with an equal priority, and/or aims to improve or sustain quality uniformly between all of the plurality of video streams, e.g., as described below.

In some demonstrative embodiments, the VQI-LTS may be configured to support a device-based quality policy, according to which the VQI-LTS may determine a maximum video quality per each device, e.g., a resolution a device should aim for, and may set one or more parameters accordingly, e.g., parameters for the MAC scheduler 130. For example, a mobile device maximum video quality may be lower than a maximum video quality for a 4K TV having a large display, e.g., as described below.

In some demonstrative embodiments, the VQI-LTS may be configured to support a user-defined quality policy, according to which the VQI-LTS may assign a quality parameter for each device, for example based on an input from a user, e.g., as described below.

In some demonstrative embodiments, the VQI-LTS may detect network bottlenecks that otherwise may not be possible to identify, e.g., in single-AP or multi-APs scenarios. For example, the VQI-LTS may expect a specific performance of the video for a next two hops in a multi-AP scenario. For example, a feedback mechanism may be implemented to provide an actual performance at each segment, and therefore may identify the bottlenecks.

In some demonstrative embodiments, device 102 may be configured to implement and/or support the VQI-LTS, e.g., as described below.

In some demonstrative embodiments, controller 124 may be configured to control, cause, trigger and/or instruct device 102 to determine at least one video quality parameter representing an estimated quality of at least one video stream to be streamed via device 102 to display device 140 over wireless communication medium 103, e.g., as described below.

In some demonstrative embodiments, controller 124 may be configured to control, cause, trigger and/or instruct device 102 to determine the video quality parameter, for example, to represent an estimated resolution of the video stream, e.g., as described below.

In other embodiments, controller 124 may be configured to control, cause, trigger and/or instruct device 102 to determine the video quality parameter, for example, to represent any other attribute of the video stream, e.g., as described below.

In some demonstrative embodiments, controller 124 may be configured to control, cause, trigger and/or instruct device 102 to determine the video quality parameter, for example, based on a data rate of the video stream, e.g., as described below.

In some demonstrative embodiments, controller 124 may be configured to control, cause, trigger and/or instruct device 102 to determine the video quality parameter, for example, based on one or more attributes of a predefined number of frames of the video stream, e.g., as described below.

In other embodiments, controller 124 may be configured to control, cause, trigger and/or instruct device 102 to determine the video quality parameter, for example, based on any other algorithms, parameters, and/or methods, e.g., as described below.

In some demonstrative embodiments, controller 124 may be configured to control, cause, trigger and/or instruct device 102 to determine a scheduling policy parameter, for example, based at least on the video quality parameter, e.g., as described below.

In some demonstrative embodiments, controller 124 may be configured to control, cause, trigger and/or instruct device 102 to provide the scheduling policy parameter to the MAC scheduler 130, for example, to schedule wireless transmission of the at least one video stream to the display device 140, e.g., as described below.

In some demonstrative embodiments, device 102 may include a video scheduler 132 configured to determine the at least one scheduling policy parameter and to provide the at least one scheduling policy parameter to the MAC schedule 130, e.g., as described below.

In some demonstrative embodiments, the at least one scheduling policy parameter may include, for example, one or more parameters to be used by the MAC scheduler 130 to schedule transmission of the video stream.

In some demonstrative embodiments, the scheduling policy parameter may include at least one Jain Fairness Index parameter, and/or an Access Category (AC) parameter, e.g., as described below.

In one example, video scheduler 132 may provide to the MAC scheduler 130 a Jain Fairness Index parameter for the video stream, for example, if the MAC scheduler 130 uses a Jain's fairness index to measure the level of fairness provided to its STAs and/or users.

In another example, video scheduler 132 may use the AC parameter for the video stream, for example, if the MAC scheduler 130 uses ACs to schedule transmissions.

In other embodiments, the scheduling policy parameter may include any other additional or alternative parameter.

In some demonstrative embodiments, controller 124 may be configured to control, cause, trigger and/or instruct device 102 to classify one or more traffic inputs according to a plurality of traffic categories including at least a video traffic category, a non-video traffic category, and/or any other additional or alternative category, e.g., as described below.

In some demonstrative embodiments, controller 124 may be configured to control, cause, trigger and/or instruct device 102 to identify the video stream to include a traffic input classified as the video traffic category, e.g., as described below.

In some demonstrative embodiments, device 102 may include a traffic classifier 134 configured to classify the one or more traffic inputs according to the plurality of traffic categories including the video traffic category and/or the non-video traffic category, e.g., as described below.

In some demonstrative embodiments, one or more elements of traffic classifier may be implemented, for example, as part of video scheduler 132, controller 124, and/or any other element of device 102.

In some demonstrative embodiments, traffic classifier 134 may be configured to categorize traffic into predetermined categories, for example, video or non-video, e.g., gaming, voice, or any other type of non-video traffic.

In one example, traffic classifier 134 may be implemented, for example, using a pre-trained model. For example, test models may be able to detect video traffic flows using only first 20 packets of the video traffic flows, for example, with an accuracy of about 65% and of about 84% weighted accuracy, e.g., when weighted by a flow size of the video traffic flows. The weighted accuracy may be more relevant, for example, as large video traffic flows may usually require more scheduling, e.g., compared to small-size video traffic flows.

In another example, traffic classifier 134 may be implemented, for example, by any other method, e.g., a third party system, for example, using local and/or cloud based models.

In some demonstrative embodiments, controller 124 may be configured to control, cause, trigger and/or instruct device 102 to determine the scheduling policy parameter, for example, based on one or more attributes of the display device 140, e.g., as described below.

In some demonstrative embodiments, controller 124 may be configured to control, cause, trigger and/or instruct device 102 to determine the one or more attributes of the display device, for example, based on a device type of the display device 140, e.g., as described below.

In some demonstrative embodiments, the one or more attributes of the display device 140 may include, for example, one or more wireless communication capabilities of the display device 140, and/or one or more screen attributes of the screen 142 of the display device 140 e.g., as described below.

In some demonstrative embodiments, the one or more wireless communication capabilities may include a wireless communication bandwidth capability of the display device 140, and/or any other additional or alternative wireless communication capabilities, e.g., as described below.

In some demonstrative embodiments, the one or more screen attributes may include a size of the screen 142, a resolution of the screen 142, and/or any other additional or alternative attribute of screen 142, e.g., as described below.

In some demonstrative embodiments, device 102 may include a device identifier 136 configured to determine the one or more attributes of the display device 140, e.g., as described below.

In some demonstrative embodiments, device identifier 136 may identify the type of streaming device 140 that consumes the video stream. Device identifier 136 may provide a subset of capabilities that may constrain scheduling of the video stream and/or influence the video policies.

In one example, device identifier 136 may be configured to provide coarse-level details about a display device 140, for example, mobile or stationary, a device manufacturer, device purpose, e.g., a tablet or TV, or any other details.

In another example, device identifier 136 may be configured to provide fine-level details about a display device 140, for example, a version number of the display device, firmware update details and/or the like.

In some demonstrative embodiments, details of the display device 140 may be used to determine an appropriate user experience for a user of display device 140. For example, reducing resolution of a video stream to a lower resolution on a large-screen TV may result in a much more negative user experience than reducing the resolution of the video stream on a small-screen mobile device.

In some demonstrative embodiments, controller 124 may be configured to control, cause, trigger and/or instruct device 102 to receive from the MAC scheduler 130 feedback information corresponding to the wireless transmission of the at least one video stream to the display device 140, e.g., as described below.

In some demonstrative embodiments, controller 124 may be configured to control, cause, trigger and/or instruct device 102 to determine at least one adjusted scheduling policy parameter based at least on the feedback information, e.g., as described below.

some demonstrative embodiments, controller 124 may be configured to control, cause, trigger and/or instruct device 102 to provide the adjusted scheduling policy parameter to the MAC scheduler 130, e.g., as described below.

In one example, the feedback information from MAC scheduler 130 may be stored into a knowledge base, for example, of scheduler video 132. The feedback information may allow the video scheduler 132 to learn device behavior, and/or effectiveness of scheduling policies in a specific network.

For example, the feedback information may allow video scheduler 132 to learn long-term behavior, and/or to use reinforcement learning models that may adapt to a specific deployment, e.g., rather than an average of users.

In some demonstrative embodiments, device 102 may be configured to determine a plurality of video quality parameters for a respective plurality of video streams, e.g., as described below.

In some demonstrative embodiments, controller 124 may be configured to control, cause, trigger and/or instruct device 102 to determine to determine a plurality of video quality parameters for a respective plurality of video streams to be streamed to a respective plurality of display devices 140 via device 102, e.g., as described below.

In some demonstrative embodiments, controller 124 may be configured to control, cause, trigger and/or instruct device 102 to determine a plurality of scheduling policy parameters, for example, based at least on the plurality of video quality parameters, e.g., as described below.

In some demonstrative embodiments, controller 124 may be configured to control, cause, trigger and/or instruct device 102 to provide the plurality of scheduling policy parameters to the MAC scheduler 130, for example, to schedule wireless transmission of the plurality of video streams to the plurality of display devices 140, e.g., as described below.

In some demonstrative embodiments, controller 124 may be configured to control, cause, trigger and/or instruct device 102 to determine the plurality of scheduling policy parameters, for example, based on a predefined video policy defining a prioritization between the plurality of video streams, e.g., as described below.

In some demonstrative embodiments, the predefined video policy may include a uniform priority video policy, a device-based video policy, a user-defined video policy, a resolution-based video policy, and/or any other predefined video policy.

In one example, the uniform priority video policy may include a video policy, according to which video quality may be uniformly improved or sustained across all the plurality of video streams.

In another example, the device-based video policy may include a video policy, according to which video quality may be adjusted, for example, based on the device type.

In another example, the user-defined video policy may include a video policy, according to which video quality may be adjusted, for example, based on a user input.

In another example, the resolution-based video policy (also referred to as "maximum quality video policy") may include a video policy, according to which video quality may be adjusted to maximize resolution, e.g., for all devices.

Figure 6:
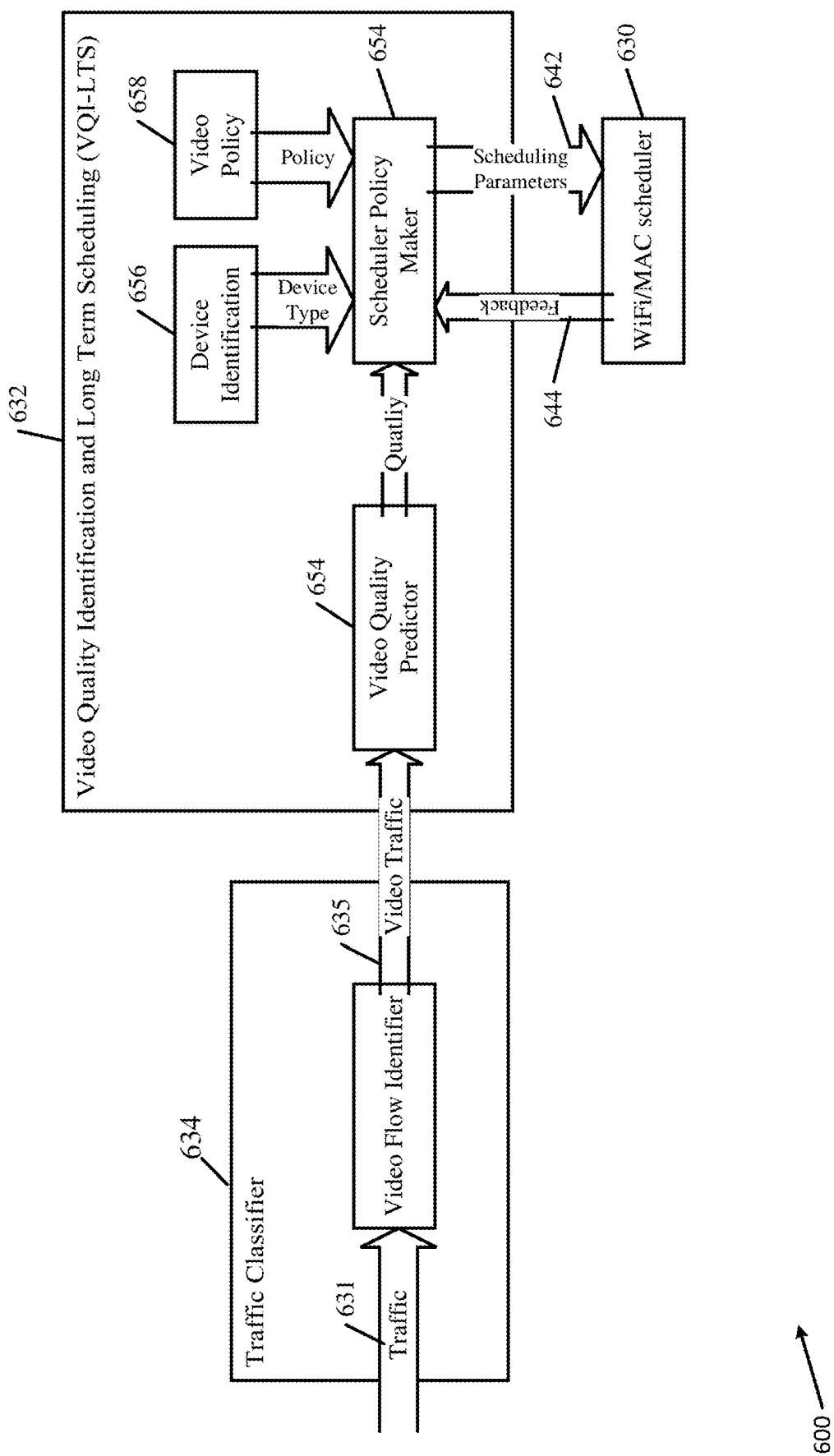
FIG. 6 is a schematic block diagram illustration of a scheduling scheme, in accordance with some demonstrative embodiments.

Reference is made to FIG. 6, which schematically illustrates a scheduling scheme 600, in accordance with some demonstrative embodiments.

In one example, device 102 (FIG. 1) may be configured to perform one or more operations and/or functionalities of scheduling scheme 600. For example, device 102 may include, implement and/or support one or more, e.g., all, elements and/or components of scheduling scheme 600.

In some demonstrative embodiments, as shown in FIG. 6, scheduling scheme 600 may include a traffic classifier 634 configured to classify one or more traffic inputs 631 into video traffic 635. For example, traffic classifier 134 (FIG. 1) may perform one or more operations of, one or more functionalities of, and/or the role of traffic classifier 634.

In some demonstrative embodiments, as shown in FIG. 6, scheduling scheme 600 may include a video scheduler 632, e.g., a VQI-LTS, configured to provide a plurality of scheduling policy parameters 642 to a MAC scheduler 630 and/or to receive from the MAC scheduler 630 feedback information 644 corresponding to the wireless transmission of the video traffic 635. For example, video scheduler 132 (FIG. 1) may perform one or more operations of, one or more functionalities of, and/or the role of video scheduler 632; and/or MAC scheduler 130 (FIG. 1) may perform one or more operations of, one or more functionalities of, and/or the role of MAC scheduler 630.

In some demonstrative embodiments, video scheduler 632 may be configured to extract information from video traffic 635, and to generate scheduling policy parameters 642 to be used at the WiFi MAC layer, e.g., by MAC scheduler 630.

In some demonstrative embodiments, as shown in FIG. 6, video scheduler 632 may include a Video Quality Predictor (VQP) 652 configured to process video traffic 635 and/or to determine a resolution of the video traffic 635.

In some demonstrative embodiments, VQP 652 may determine the resolution of the video traffic 635, for example, by inspecting a few seconds of video at a time. For example, a classification model may be trained to predict video quality, for example, based on flow characteristics, e.g., a packet size and/or an inter-packet arrival time.

In one example, there may be a correlation between a video data rate and a resolution used by the video player, and the video buffer size, e.g., as described below.

Figure 7:
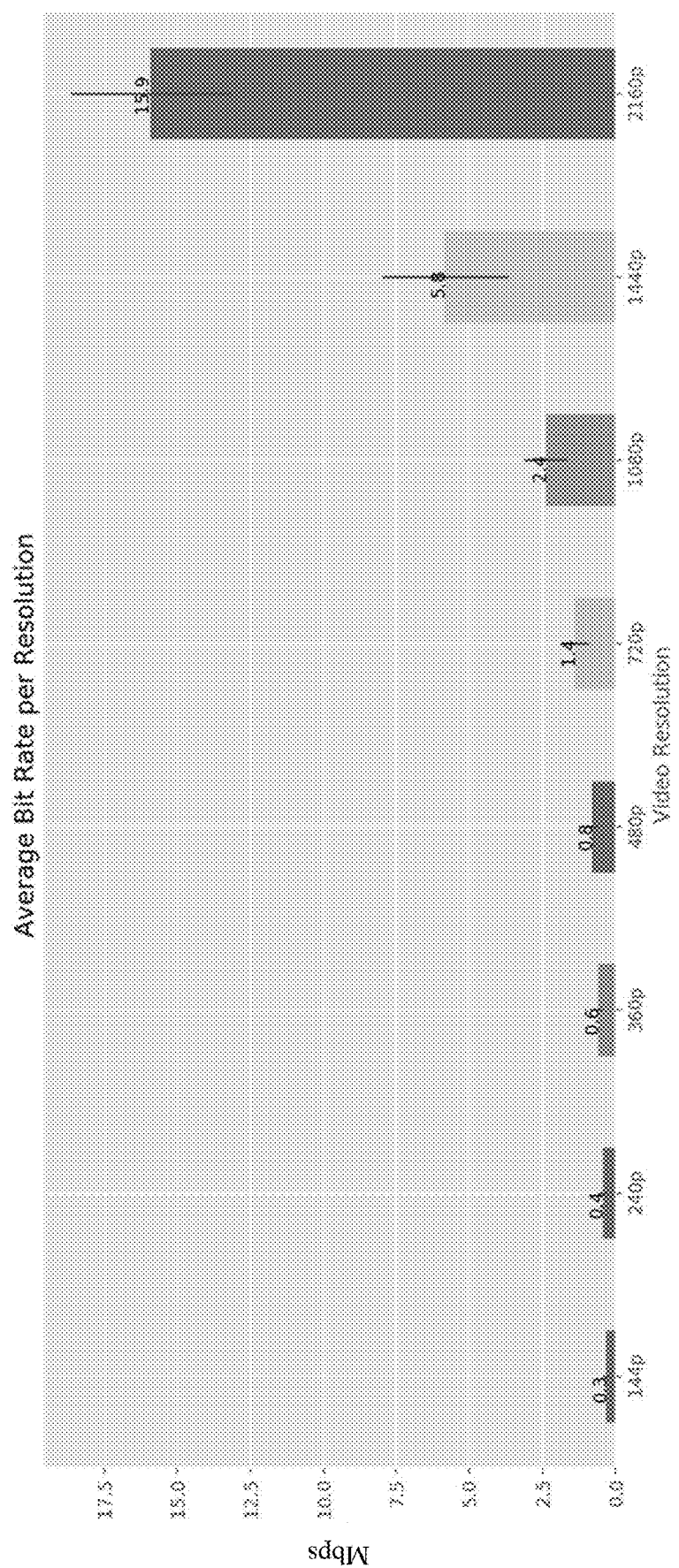
FIG. 7 is a schematic illustration of a graph depicting average bit rates per resolution of video streams, which may be implemented in accordance with some demonstrative embodiments.

Reference is made to FIG. 7, which schematically illustrates a graph 700 depicting average bit rates per resolution of video streams, which may be implemented in accordance with some demonstrative embodiments.

In one example, graph 700 may be based on a sample of 400 received video streams.

In some demonstrative embodiments, as shown by graph 700, the higher the video quality, e.g., a resolution, of a video stream the higher the data rate of the video stream.

Figure 8:
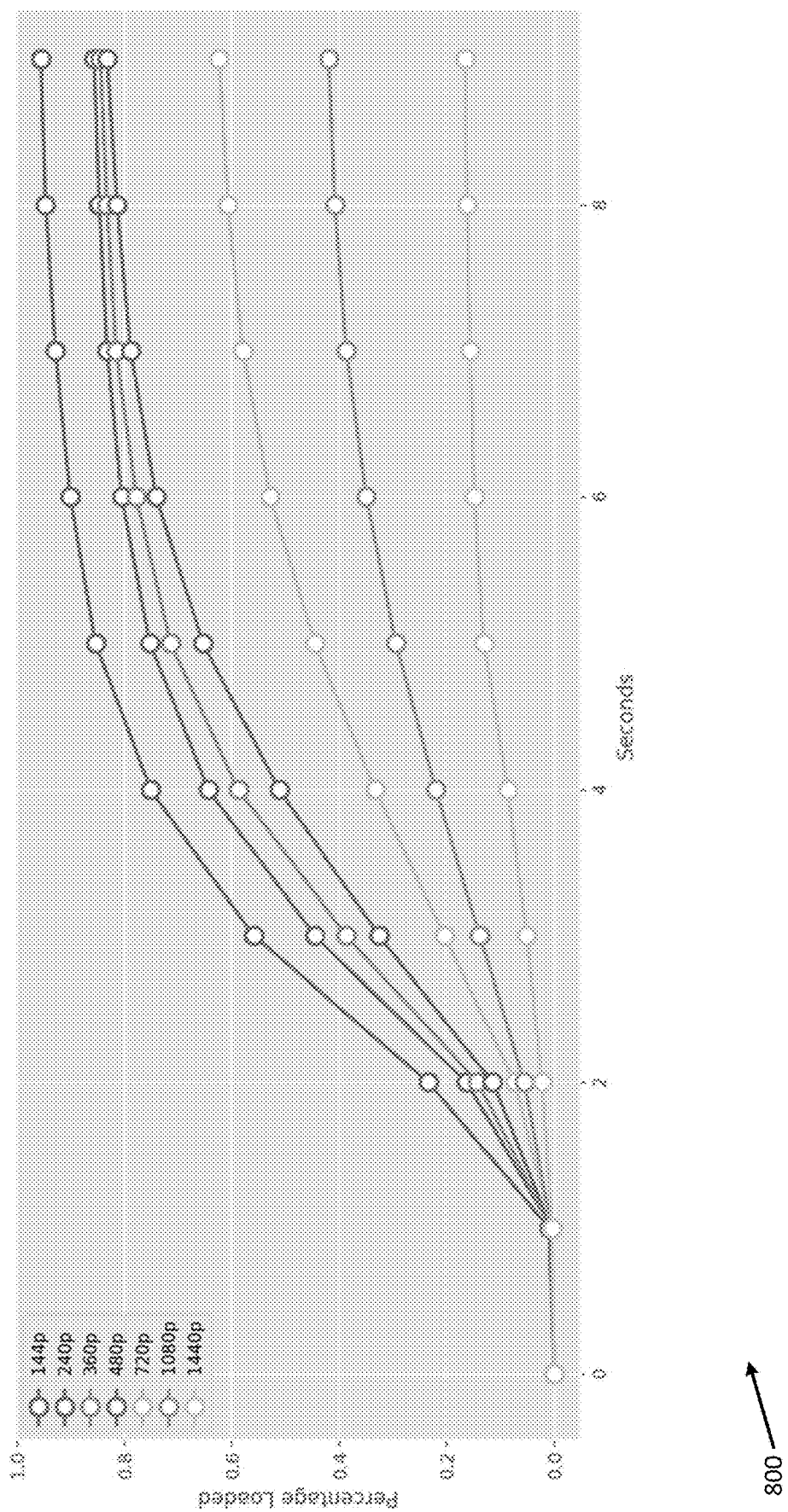
FIG. 8 is a schematic illustration of a graph depicting percentages of video loaded over time per resolution of video streams, which may be implemented in accordance with some demonstrative embodiments.

Reference is made to FIG. 8, which schematically illustrates a graph 800 depicting percentages of video loaded over time per resolution of video streams, which may be implemented in accordance with some demonstrative embodiments.

In one example, graph 800 shows the percentage of video loaded within the first 10 seconds of playback of a video stream.

In some demonstrative embodiments, as shown by graph 800, the lower the resolution of the video the higher the percentage loaded of the video, and vice versa.

Referring back to FIG. 6, in one example, a video quality predictor, e.g., VQP 652, may be able to obtain, for example, at least 61% accuracy on classifying HD video streams, for example, by performing a shallow inspection, e.g., a non-invasive inspection, of the first five seconds, or any other duration, of video, for example, by computing inter-packet arrival and packet size features per flow.

In another example, a higher level of classification accuracy may be achieved, for example, by observing flows for longer periods of time and/or reducing a number of discreet classes. For example, systems that support Deep Packet Inspection (DPI) may parse the inner headers, e.g., to significantly enhance accuracy.

In some demonstrative embodiments, as shown in FIG. 6, video scheduler 632 may include a device identifier 656 to identify type information corresponding to the device to consume video traffic 635. For example, device identifier 136 (FIG. 1) may perform one or more operations of, one or more functionalities of, and/or the role of device identifier 656.

In some demonstrative embodiments, as shown in FIG. 6, video scheduler 632 may include a video policy storage 658 configured to store a plurality of predefined video policies, e.g., different video policies, to be applied to the video flows.

In some demonstrative embodiments, as shown in FIG. 6, video scheduler 632 may include a Scheduler Policy Maker (SPM) 654 configured to use device characteristics received from the device identifier 656, video policies from video policy storage 658, for example, to optimize scheduling policy parameters 642, e.g., the set of parameters or metapolicy to be use by a short time scheduler, e.g., MAC scheduler 630.

In some demonstrative embodiments, SPM 654 may incorporate the feedback 644 from the MAC scheduler 630 into its knowledge base, e.g., at every round.

In some demonstrative embodiments, feedback 644 may be implemented by the SPM 654, for example, to learn device behavior and effectiveness of the scheduling policies in the specific network.

In some demonstrative embodiments, the SPM 654 may be configured to solve an optimization problem to find a suitable subset, e.g., the best subset, of scheduling policy parameters 642, for example, to maintain or improve the video quality.

In some demonstrative embodiments, feedback 644 may be implemented by video scheduler 632, for example, to learn long-term behavior, and/or may for reinforcement learning models that may adapt to a specific deployment, e.g., rather than an average of users.

In some demonstrative embodiments, scheduling scheme 600 may perform one or more operations, for example, when a new traffic flow 631 starts, and the traffic classifier 634 evaluates flow characteristics of traffic flow 631 and determines the type of traffic, e.g., video or non-video flow.

In some demonstrative embodiments, if the traffic flow 631 is determined to be video traffic 635, the traffic flow 631 may be re-routed through a VQI-LTS path, e.g., to video scheduler 632.

In some demonstrative embodiments, the video traffic 635 may be directed to the VQP 652.

In some demonstrative embodiments, VQP 652 may predict a current video quality of the traffic.

In one example, video traffic 635 may be classified as a 720p quality video or any other quality video.

In some demonstrative embodiments, the device identification module 656 may identify a type of device associated with the video traffic 635, and may provide information of a connection and/or wireless capabilities and/or video capabilities of the device, e.g., substantially at the same time when VQP 652 predicts the current video quality of the traffic.

In some demonstrative embodiments, the video policy component 658 may determine applicable base policies, for example, from a predefined list, e.g., as described above.

In some demonstrative embodiments, SPM 654 may generate a meta-policy, e.g., including scheduling policy parameters 642, that suits traffic and maximizes user experience, for example, based on the video quality predicted by VQP 652, the base policy from video policy 658, and/or the device classification determined by device identifier 565.

In one example, MAC schedulers, e.g., MAC scheduler 630, may be designed to maximize a network throughput and/or to try to be fair with all the STAs, e.g., from an airtime perspective, for example, regardless of the application traffic that is being transmitted. Furthermore, a scope of a MAC scheduler, e.g., a typical MAC scheduler, may be in an order of milliseconds.

In some demonstrative embodiments, SPM 654 may be configured to influence the "throughput maximization" or "fairness" of the MAC scheduler 630, for example, to maximize user experience for the duration of use. The scope considered by SPM 654 may be in an order of seconds or minutes, thus considering traffic, a usage, one or more resources, and/or expected performance.

In some demonstrative embodiments, the influence of SPM 654 over the MAC scheduler 63, e.g., through scheduling parameters 642, may be configured to affect queuing decisions, for example, by overwriting packet markings, or fairness, e.g., by changing queue weights.

In one example, it may not be advantageous, e.g., from an application perspective, to have the MAC scheduler 630 use the Jain's fairness index to measure a level of fairness provided to all its STAs and/or users. For example, a first user may be watching a video from a video application on a smart TV, e.g., in a first Transmission Control Protocol (TCP) session, and a second user may be downloading a file via a file transfer application, e.g., in a second TCP session. According to this example, the MAC scheduler 630 may try to be fair with both users, e.g., by providing similar throughput to both, and if there may not be enough throughput and/or bandwidth for the video application, the video streaming will decrease its resolution. For example, the SPM 654 may be configured to correct this kind of behavior, for example, by providing a suitable set of "weights" ($\alpha i$) for a modified Jain's fairness index, e.g., [J(x1, x2, ... xn)=f($\alpha$1x1, $\alpha$2x2, anxn)], for example, to enable the video application to maintain its resolution optimal, for example, based on the device capabilities, e.g., the screen size, screen resolution, and the like.

In another example, the MAC scheduler 630 may try to achieve Max-Min fairness, for example, by equally distributing a bandwidth among the STAs, and making minimal increments to all flows, e.g., until all flows are satisfied or the bandwidth is exhausted. Accordingly, the bandwidth may be exhausted, and at the application level, the video streaming may adapt and decrease its resolution based on the available bandwidth. For example, the SPM 654 may be configured to influence the MAC scheduler as this fairness does not take into account application level requirements and/or does not consider a type of traffic and/or applications.

In some demonstrative embodiments, SPM 654 may influence the MAC scheduler 630 by marking the video packets, for example, instead of or in addition to influencing the fairness of the MAC scheduler 630, e.g., as described below.

In one example, SPM 654 may mark the video packets to be put in an Access Category Video (AC_VI) queue instead of the Access Category Best Effort (AC_BE) queue, e.g., as DASH Video Streaming application may run on top of HTTP, which may be considered as AC_BE.

In another example, SPM 654 may influence the MAC scheduler 630 by providing a policy on how the MAC scheduler 630 sends and/or transmits packets from the different queues to different users, e.g., an order and a number of packets In another example, SPM 654 may influence the MAC scheduler 630 by any other means, methods, inputs, and/or parameters.

In some demonstrative embodiments, if the traffic flow 631 is non-video traffic, the meta-policies, e.g., scheduling policy parameters 642, may be set with default values.

In some demonstrative embodiments, the MAC/PHY scheduler 630 may receive the meta-policies, and may schedule traffic, for example, based on the parameters set by the meta-policies.

In some demonstrative embodiments, scheduling scheme 600 may provide improved user experience for video streaming content, for example, in wireless home networks, e.g., in single-AP and/or Multi-AP scenarios.

In some demonstrative embodiments, scheduling scheme 600 may include a two-tier scheduler architecture, in which the long-term scheduler 632 may influence the MAC scheduler 630, for example, to address the video streaming problem.

In some demonstrative embodiments, video scheduler 630, e.g., the VQI-LTS, may assist the MAC scheduler 630 to assess network resources required to keep an adequate video streaming experience in the long term. For example, without this capability, the MAC scheduler 630 may have only a short-term view of sending and/or receiving packets, regardless of the application that actually uses those packets.

In some demonstrative embodiments, scheduling scheme 600 may allow an increased adaption of the video streaming application, for example, based on available wireless resources, e.g., compared to a typical application level adaptation, in which an end-to-end estimation is required to increase or decrease the video quality.

Figure 9:
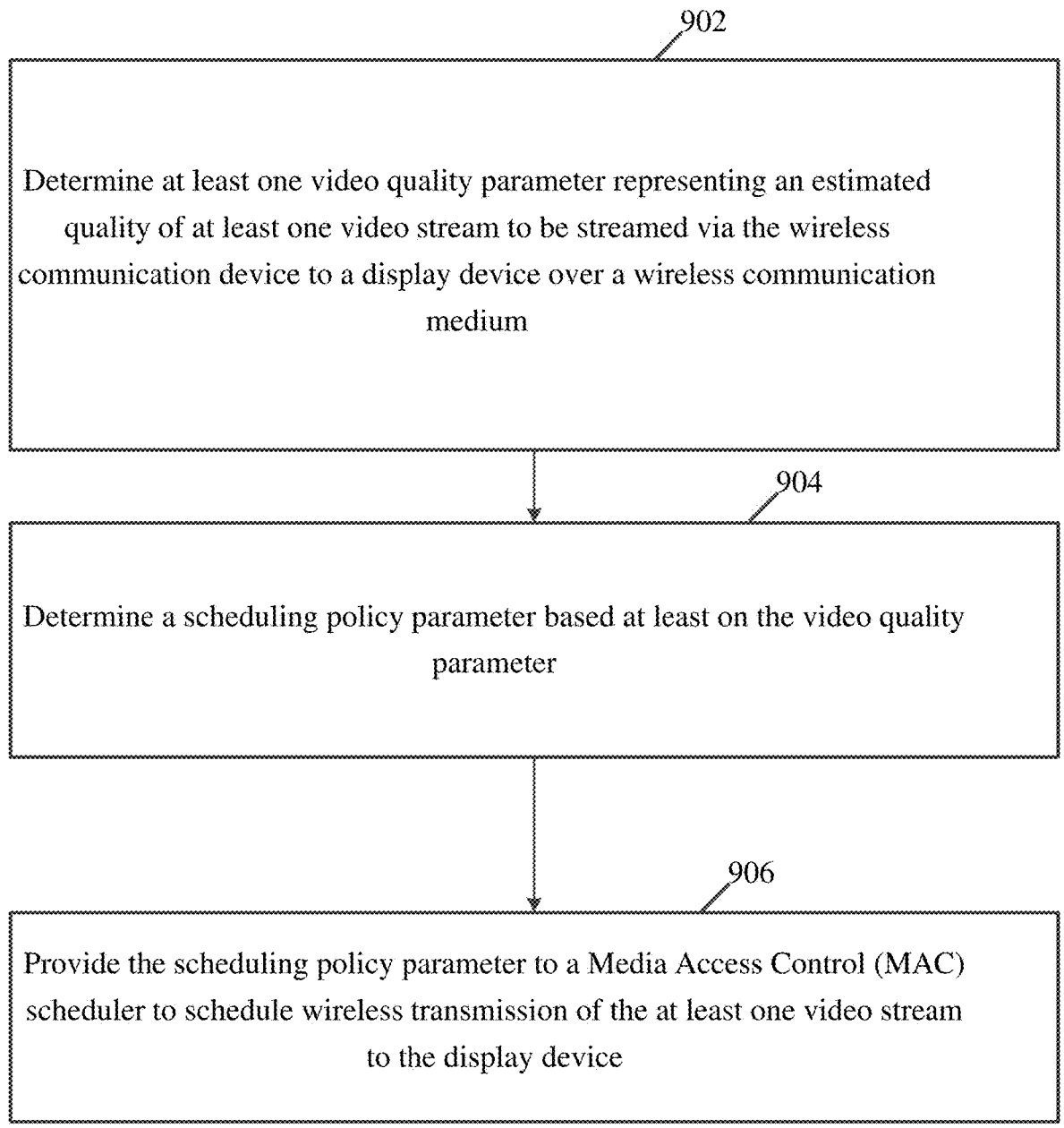
FIG. 9 is a schematic flow-chart illustration of a method of wireless video streaming, in accordance with some demonstrative embodiments.

Reference is made to FIG. 9, which schematically illustrates a method of scheduling wireless transmission of at least one video stream, in accordance with some demonstrative embodiments. For example, one or more of the operations of the method of FIG. 9 may be performed by one or more elements of a system, e.g., system 100 (FIG. 1), for example, one or more wireless devices, e.g., device 102 (FIG. 1), a radio, e.g., radio 114 (FIG. 1), a controller, e.g., controller 124 (FIG. 1), a video scheduler, e.g., video scheduler 132 (FIG. 1), video scheduling scheme 600 (FIG. 6), and/or video scheduler 632 (FIG. 6), and/or a message processor, e.g., message processor 128 (FIG. 1).

As indicated at block 902, the method may include determining at least one video quality parameter representing an estimated quality of at least one video stream to be streamed via a wireless communication device to a display device over a wireless communication medium. For example, controller 124 (FIG. 1) may be configured to control, cause, trigger and/or instruct device 102 (FIG. 1) to determine the at least one video quality parameter representing the estimated quality of the at least one video stream to be streamed via device 102 (FIG. 1) to display device 140 (FIG. 1) over wireless communication medium 103 (FIG. 1), e.g., as described above.

As indicated at block 904, the method may include determining a scheduling policy parameter based at least on the video quality parameter. For example, controller 124 (FIG. 1) may be configured to control, cause, trigger and/or instruct device 102 (FIG. 1) to determine the scheduling policy parameter based at least on the video quality parameter, e.g., as described above.

As indicated at block 906, the method may include providing the scheduling policy parameter to a MAC scheduler to schedule wireless transmission of the at least one video stream to the display device. For example, controller 124 (FIG. 1) may be configured to control, cause, trigger and/or instruct device 102 (FIG. 1) to provide the scheduling policy parameter to MAC scheduler 130 (FIG. 1) to schedule wireless transmission of the at least one video stream to the display device 140 (FIG. 1), e.g., as described above.

Figure 10:
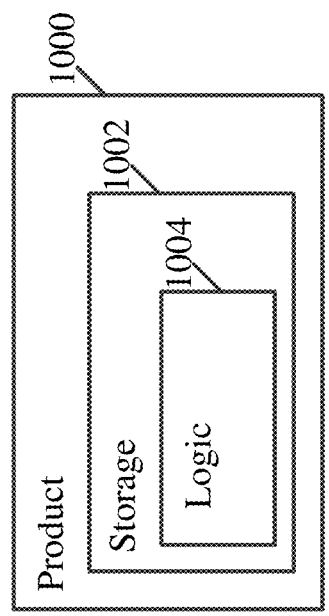
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable ("machine-readable") non-transitory storage media 1002, which may include computer-executable instructions, e.g., implemented by logic 1004, operable to, when executed by at least one computer processor, enable the at least one computer processor to implement one or more operations at device 102 (FIG. 1), radio 114 (FIG. 1), controller 124 (FIG. 1), video scheduler 132 (FIG. 1), video scheduler 632 (FIG. 6), and/or message processor 128 (FIG. 1), to cause device 102 (FIG. 1), radio 114 (FIG. 1), controller 124 (FIG. 1), video scheduler 132 (FIG. 1), video scheduling scheme 600 (FIG. 6), video scheduler 632 (FIG. 6), and/or message processor 128 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7, 8, and/or 9, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 1000 and/or machine-readable storage media 1002 may include one or more types of computer-readable storage media capable of storing data, including volatile memory, non-volatile memory, removable or non-removable memory, erasable or non-erasable memory, writeable or re-writeable memory, and the like. For example, machine-readable storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless communication device to determine at least one video quality parameter representing an estimated quality of at least one video stream to be streamed via the wireless communication device to a display device over a wireless communication medium; determine a scheduling policy parameter based at least on the video quality parameter; and provide the scheduling policy parameter to a Media Access Control (MAC) scheduler to schedule wireless transmission of the at least one video stream to the display device.

Example 2 includes the subject matter of Example 1, and optionally, wherein the apparatus is configured to cause the wireless communication device to determine the scheduling policy parameter based on one or more attributes of the display device.

Example 3 includes the subject matter of Example 2, and optionally, wherein the apparatus is configured to cause the wireless communication device to determine the one or more attributes of the display device based on a device type of the display device.

Example 4 includes the subject matter of Example 2 or 3, and optionally, wherein the one or more attributes of the display device comprise at least one of one or more wireless communication capabilities of the display device, or one or more screen attributes of a screen of the display device.

Example 5 includes the subject matter of Example 4, and optionally, wherein the one or more wireless communication capabilities comprise a wireless communication bandwidth capability of the display device.

Example 6 includes the subject matter of Example 4 or 5, and optionally, wherein the one or more screen attributes comprise at least one of a size of the screen, or a resolution of the screen.

Example 7 includes the subject matter of any one of Examples 1-6, and optionally, wherein the apparatus is configured to cause the wireless communication device to determine a plurality of video quality parameters for a respective plurality of video streams to be streamed to a respective plurality of display devices via the wireless communication device, to determine a plurality of scheduling policy parameters based at least on the plurality of video quality parameters, and to provide the plurality of scheduling policy parameters to the MAC scheduler to schedule wireless transmission of the plurality of video streams to the plurality of display devices.

Example 8 includes the subject matter of Example 7, and optionally, wherein the apparatus is configured to cause the wireless communication device to determine the plurality of scheduling policy parameters based on a predefined video policy defining a prioritization between the plurality of video streams.

Example 9 includes the subject matter of Example 8, and optionally, wherein the predefined video policy comprises a uniform priority video policy, a device-based video policy, a user-defined video policy, or a resolution-based video policy.

Example 10 includes the subject matter of any one of Examples 1-9, and optionally, wherein the apparatus is configured to cause the wireless communication device to receive from the MAC scheduler feedback information corresponding to the wireless transmission of the at least one video stream to the display device, to determine at least one adjusted scheduling policy parameter based at least on the feedback information, and to provide the adjusted scheduling policy parameter to the MAC scheduler.

Example 11 includes the subject matter of any one of Examples 1-10, and optionally, wherein the apparatus is configured to cause the wireless communication device to classify one or more traffic inputs according to a plurality of traffic categories comprising at least a video traffic category and a non-video traffic category, and to identify the video stream to comprise a traffic input classified as the video traffic category.

Example 12 includes the subject matter of any one of Examples 1-11, and optionally, wherein the apparatus is configured to cause the wireless communication device to determine the video quality parameter based on a data rate of the video stream.

Example 13 includes the subject matter of any one of Examples 1-12, and optionally, wherein the apparatus is configured to cause the wireless communication device to determine the video quality parameter based on one or more attributes of a predefined number of frames of the video stream.

Example 14 includes the subject matter of any one of Examples 1-13, and optionally, wherein the apparatus is configured to cause the wireless communication device to determine the video quality parameter to represent an estimated resolution of the video stream.

Example 15 includes the subject matter of any one of Examples 1-14, and optionally, wherein the scheduling policy parameter comprises a Jain Fairness Index parameter or an Access Category (AC) parameter.

Example 16 includes the subject matter of any one of Examples 1-15, and optionally, comprising a video scheduler to provide the at least one scheduling policy parameter to the MAC scheduler.

Example 17 includes the subject matter of any one of Examples 1-16, and optionally, comprising the MAC scheduler.

Example 18 includes the subject matter of any one of Examples 1-17, and optionally, comprising an Access Point (AP), the AP comprising a network interface to receive the at least one video stream from a video provider via a communication network.

Example 19 includes the subject matter of any one of Examples 1-18, and optionally, comprising a radio to transmit the wireless transmission of the video stream.

Example 20 includes the subject matter of Example 19, and optionally, comprising one or more antennas connected to the radio, a memory, and a processor.

Example 21 includes a system comprising a wireless communication device, the wireless communication device comprising one or more antennas; a radio; a memory; a Media Access Control (MAC) scheduler; and a controller configured to cause the wireless communication device to determine at least one video quality parameter representing an estimated quality of at least one video stream to be streamed via the wireless communication device to a display device over a wireless communication medium; determine a scheduling policy parameter based at least on the video quality parameter; and provide the scheduling policy parameter to the MAC scheduler to schedule wireless transmission of the at least one video stream to the display device.

Example 22 includes the subject matter of Example 21, and optionally, wherein the controller is configured to cause the wireless communication device to determine the scheduling policy parameter based on one or more attributes of the display device.

Example 23 includes the subject matter of Example 22, and optionally, wherein the controller is configured to cause the wireless communication device to determine the one or more attributes of the display device based on a device type of the display device.

Example 24 includes the subject matter of Example 22 or 23, and optionally, wherein the one or more attributes of the display device comprise at least one of one or more wireless communication capabilities of the display device, or one or more screen attributes of a screen of the display device.

Example 25 includes the subject matter of Example 24, and optionally, wherein the one or more wireless communication capabilities comprise a wireless communication bandwidth capability of the display device.

Example 26 includes the subject matter of Example 24 or 25, and optionally, wherein the one or more screen attributes comprise at least one of a size of the screen, or a resolution of the screen.

Example 27 includes the subject matter of any one of Examples 21-26, and optionally, wherein the controller is configured to cause the wireless communication device to determine a plurality of video quality parameters for a respective plurality of video streams to be streamed to a respective plurality of display devices via the wireless communication device, to determine a plurality of scheduling policy parameters based at least on the plurality of video quality parameters, and to provide the plurality of scheduling policy parameters to the MAC scheduler to schedule wireless transmission of the plurality of video streams to the plurality of display devices.

Example 28 includes the subject matter of Example 27, and optionally, wherein the controller is configured to cause the wireless communication device to determine the plurality of scheduling policy parameters based on a predefined video policy defining a prioritization between the plurality of video streams.

Example 29 includes the subject matter of Example 28, and optionally, wherein the predefined video policy comprises a uniform priority video policy, a device-based video policy, a user-defined video policy, or a resolution-based video policy.

Example 30 includes the subject matter of any one of Examples 21-29, and optionally, wherein the controller is configured to cause the wireless communication device to receive from the MAC scheduler feedback information corresponding to the wireless transmission of the at least one video stream to the display device, to determine at least one adjusted scheduling policy parameter based at least on the feedback information, and to provide the adjusted scheduling policy parameter to the MAC scheduler.

Example 31 includes the subject matter of any one of Examples 21-30, and optionally, wherein the controller is configured to cause the wireless communication device to classify one or more traffic inputs according to a plurality of traffic categories comprising at least a video traffic category and a non-video traffic category, and to identify the video stream to comprise a traffic input classified as the video traffic category.

Example 32 includes the subject matter of any one of Examples 21-31, and optionally, wherein the controller is configured to cause the wireless communication device to determine the video quality parameter based on a data rate of the video stream.

Example 33 includes the subject matter of any one of Examples 21-32, and optionally, wherein the controller is configured to cause the wireless communication device to determine the video quality parameter based on one or more attributes of a predefined number of frames of the video stream.

Example 34 includes the subject matter of any one of Examples 21-33, and optionally, wherein the controller is configured to cause the wireless communication device to determine the video quality parameter to represent an estimated resolution of the video stream.

Example 35 includes the subject matter of any one of Examples 21-34, and optionally, wherein the scheduling policy parameter comprises a Jain Fairness Index parameter or an Access Category (AC) parameter.

Example 36 includes the subject matter of any one of Examples 21-35, and optionally, wherein the wireless communication device comprises a video scheduler to provide the at least one scheduling policy parameter to the MAC scheduler.

Example 37 includes the subject matter of any one of Examples 21-36, and optionally, wherein the wireless communication device comprises an Access Point (AP), the AP comprising a network interface to receive the at least one video stream from a video provider via a communication network.

Example 38 includes the subject matter of any one of Examples 21-37, and optionally, wherein the radio is to transmit the wireless transmission of the video stream.

Example 39 includes a method to be performed at a wireless communication device, the method comprising determining at least one video quality parameter representing an estimated quality of at least one video stream to be streamed via the wireless communication device to a display device over a wireless communication medium; determining a scheduling policy parameter based at least on the video quality parameter; and providing the scheduling policy parameter to a Media Access Control (MAC) scheduler to schedule wireless transmission of the at least one video stream to the display device.

Example 40 includes the subject matter of Example 39, and optionally, comprising determining the scheduling policy parameter based on one or more attributes of the display device.

Example 41 includes the subject matter of Example 40, and optionally, comprising determining the one or more attributes of the display device based on a device type of the display device.

Example 42 includes the subject matter of Example 40 or 41, and optionally, wherein the one or more attributes of the display device comprise at least one of one or more wireless communication capabilities of the display device, or one or more screen attributes of a screen of the display device.

Example 43 includes the subject matter of Example 42, and optionally, wherein the one or more wireless communication capabilities comprise a wireless communication bandwidth capability of the display device.

Example 44 includes the subject matter of Example 42 or 43, and optionally, wherein the one or more screen attributes comprise at least one of a size of the screen, or a resolution of the screen.

Example 45 includes the subject matter of any one of Examples 39-44, and optionally, comprising determining a plurality of video quality parameters for a respective plurality of video streams to be streamed to a respective plurality of display devices via the wireless communication device, determining a plurality of scheduling policy parameters based at least on the plurality of video quality parameters, and providing the plurality of scheduling policy parameters to the MAC scheduler to schedule wireless transmission of the plurality of video streams to the plurality of display devices.

Example 46 includes the subject matter of Example 45, and optionally, comprising determining the plurality of scheduling policy parameters based on a predefined video policy defining a prioritization between the plurality of video streams.

Example 47 includes the subject matter of Example 46, and optionally, wherein the predefined video policy comprises a uniform priority video policy, a device-based video policy, a user-defined video policy, or a resolution-based video policy.

Example 48 includes the subject matter of any one of Examples 39-47, and optionally, comprising receiving from the MAC scheduler feedback information corresponding to the wireless transmission of the at least one video stream to the display device, determining at least one adjusted scheduling policy parameter based at least on the feedback information, and providing the adjusted scheduling policy parameter to the MAC scheduler.

Example 49 includes the subject matter of any one of Examples 39-48, and optionally, comprising classifying one or more traffic inputs according to a plurality of traffic categories comprising at least a video traffic category and a non-video traffic category, and identifying the video stream to comprise a traffic input classified as the video traffic category.

Example 50 includes the subject matter of any one of Examples 39-49, and optionally, comprising determining the video quality parameter based on a data rate of the video stream.

Example 51 includes the subject matter of any one of Examples 39-50, and optionally, comprising determining the video quality parameter based on one or more attributes of a predefined number of frames of the video stream.

Example 52 includes the subject matter of any one of Examples 39-51, and optionally, comprising determining the video quality parameter to represent an estimated resolution of the video stream.

Example 53 includes the subject matter of any one of Examples 39-52, and optionally, wherein the scheduling policy parameter comprises a Jain Fairness Index parameter or an Access Category (AC) parameter.

Example 54 includes the subject matter of any one of Examples 39-53, and optionally, comprising receiving the at least one video stream from a video provider via a communication network.

Example 55 includes a product comprising one or more tangible computer-readable non-transitory storage media comprising computer-executable instructions operable to, when executed by at least one processor, enable the at least one processor to cause a wireless communication device to determine at least one video quality parameter representing an estimated quality of at least one video stream to be streamed via the wireless communication device to a display device over a wireless communication medium; determine a scheduling policy parameter based at least on the video quality parameter; and provide the scheduling policy parameter to a Media Access Control (MAC) scheduler to schedule wireless transmission of the at least one video stream to the display device.

Example 56 includes the subject matter of Example 55, and optionally, wherein the instructions, when executed, cause the wireless communication device to determine the scheduling policy parameter based on one or more attributes of the display device.

Example 57 includes the subject matter of Example 56, and optionally, wherein the instructions, when executed, cause the wireless communication device to determine the one or more attributes of the display device based on a device type of the display device.

Example 58 includes the subject matter of Example 56 or 57, and optionally, wherein the one or more attributes of the display device comprise at least one of one or more wireless communication capabilities of the display device, or one or more screen attributes of a screen of the display device.

Example 59 includes the subject matter of Example 58, and optionally, wherein the one or more wireless communication capabilities comprise a wireless communication bandwidth capability of the display device.

Example 60 includes the subject matter of Example 58 or 59, and optionally, wherein the one or more screen attributes comprise at least one of a size of the screen, or a resolution of the screen.

Example 61 includes the subject matter of any one of Examples 55-60, and optionally, wherein the instructions, when executed, cause the wireless communication device to determine a plurality of video quality parameters for a respective plurality of video streams to be streamed to a respective plurality of display devices via the wireless communication device, to determine a plurality of scheduling policy parameters based at least on the plurality of video quality parameters, and to provide the plurality of scheduling policy parameters to the MAC scheduler to schedule wireless transmission of the plurality of video streams to the plurality of display devices.

Example 62 includes the subject matter of Example 61, and optionally, wherein the instructions, when executed, cause the wireless communication device to determine the plurality of scheduling policy parameters based on a predefined video policy defining a prioritization between the plurality of video streams.

Example 63 includes the subject matter of Example 62, and optionally, wherein the predefined video policy comprises a uniform priority video policy, a device-based video policy, a user-defined video policy, or a resolution-based video policy.

Example 64 includes the subject matter of any one of Examples 55-63, and optionally, wherein the instructions, when executed, cause the wireless communication device to receive from the MAC scheduler feedback information corresponding to the wireless transmission of the at least one video stream to the display device, to determine at least one adjusted scheduling policy parameter based at least on the feedback information, and to provide the adjusted scheduling policy parameter to the MAC scheduler.

Example 65 includes the subject matter of any one of Examples 55-64, and optionally, wherein the instructions, when executed, cause the wireless communication device to classify one or more traffic inputs according to a plurality of traffic categories comprising at least a video traffic category and a non-video traffic category, and to identify the video stream to comprise a traffic input classified as the video traffic category.

Example 66 includes the subject matter of any one of Examples 55-65, and optionally, wherein the instructions, when executed, cause the wireless communication device to determine the video quality parameter based on a data rate of the video stream.

Example 67 includes the subject matter of any one of Examples 55-66, and optionally, wherein the instructions, when executed, cause the wireless communication device to determine the video quality parameter based on one or more attributes of a predefined number of frames of the video stream.

Example 68 includes the subject matter of any one of Examples 55-67, and optionally, wherein the instructions, when executed, cause the wireless communication device to determine the video quality parameter to represent an estimated resolution of the video stream.

Example 69 includes the subject matter of any one of Examples 55-68, and optionally, wherein the scheduling policy parameter comprises a Jain Fairness Index parameter or an Access Category (AC) parameter.

Example 70 includes the subject matter of any one of Examples 55-69, and optionally, wherein the instructions, when executed, cause the wireless communication device to receive the at least one video stream from a video provider via a communication network.

Example 71 includes an apparatus of a wireless communication device, the apparatus comprising means for determining at least one video quality parameter representing an estimated quality of at least one video stream to be streamed via the wireless communication device to a display device over a wireless communication medium; means for determining a scheduling policy parameter based at least on the video quality parameter; and means for providing the scheduling policy parameter to a Media Access Control (MAC) scheduler to schedule wireless transmission of the at least one video stream to the display device.

Example 72 includes the subject matter of Example 71, and optionally, comprising means for determining the scheduling policy parameter based on one or more attributes of the display device.

Example 73 includes the subject matter of Example 72, and optionally, comprising means for determining the one or more attributes of the display device based on a device type of the display device.

Example 74 includes the subject matter of Example 72 or 73, and optionally, wherein the one or more attributes of the display device comprise at least one of one or more wireless communication capabilities of the display device, or one or more screen attributes of a screen of the display device.

Example 75 includes the subject matter of Example 74, and optionally, wherein the one or more wireless communication capabilities comprise a wireless communication bandwidth capability of the display device.

Example 76 includes the subject matter of Example 74 or 75, and optionally, wherein the one or more screen attributes comprise at least one of a size of the screen, or a resolution of the screen.

Example 77 includes the subject matter of any one of Examples 71-76, and optionally, comprising means for determining a plurality of video quality parameters for a respective plurality of video streams to be streamed to a respective plurality of display devices via the wireless communication device, determining a plurality of scheduling policy parameters based at least on the plurality of video quality parameters, and providing the plurality of scheduling policy parameters to the MAC scheduler to schedule wireless transmission of the plurality of video streams to the plurality of display devices.

Example 78 includes the subject matter of Example 77, and optionally, comprising means for determining the plurality of scheduling policy parameters based on a predefined video policy defining a prioritization between the plurality of video streams.

Example 79 includes the subject matter of Example 78, and optionally, wherein the predefined video policy comprises a uniform priority video policy, a device-based video policy, a user-defined video policy, or a resolution-based video policy.

Example 80 includes the subject matter of any one of Examples 71-79, and optionally, comprising means for receiving from the MAC scheduler feedback information corresponding to the wireless transmission of the at least one video stream to the display device, determining at least one adjusted scheduling policy parameter based at least on the feedback information, and providing the adjusted scheduling policy parameter to the MAC scheduler.

Example 81 includes the subject matter of any one of Examples 71-80, and optionally, comprising means for classifying one or more traffic inputs according to a plurality of traffic categories comprising at least a video traffic category and a non-video traffic category, and identifying the video stream to comprise a traffic input classified as the video traffic category.

Example 82 includes the subject matter of any one of Examples 71-81, and optionally, comprising means for determining the video quality parameter based on a data rate of the video stream.

Example 83 includes the subject matter of any one of Examples 71-82, and optionally, comprising means for determining the video quality parameter based on one or more attributes of a predefined number of frames of the video stream.

Example 84 includes the subject matter of any one of Examples 71-83, and optionally, comprising means for determining the video quality parameter to represent an estimated resolution of the video stream.

Example 85 includes the subject matter of any one of Examples 71-84, and optionally, wherein the scheduling policy parameter comprises a Jain Fairness Index parameter or an Access Category (AC) parameter.

Example 86 includes the subject matter of any one of Examples 71-85, and optionally, comprising means for receiving the at least one video stream from a video provider via a communication network.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication device to:
   determine at least one video quality parameter representing an estimated quality of at least one video stream to be streamed via the wireless communication device to a display device over a wireless communication medium;
   determine a scheduling policy parameter based at least on the video quality parameter and on one or more screen attributes of a screen of the display device, the one or more screen attributes of the screen of the display device comprising at least one of a size of the screen of the display device, or a resolution of the screen of the display device; and
   provide the scheduling policy parameter to a Media Access Control (MAC) scheduler to schedule wireless transmission of the at least one video stream to the display device.

2. The apparatus of claim 1 configured to cause the wireless communication device to determine the one or more screen attributes of the screen of the display device based on a device type of the display device.

3. The apparatus of claim 1 configured to cause the wireless communication device to determine the scheduling policy parameter based on one or more wireless communication capabilities of the display device.

4. The apparatus of claim 3, wherein the one or more wireless communication capabilities comprise a wireless communication bandwidth capability of said display device.

5. The apparatus of claim 1 configured to cause the wireless communication device to determine a plurality of video quality parameters for a respective plurality of video streams to be streamed to a respective plurality of display devices via the wireless communication device, to determine a plurality of scheduling policy parameters based at least on the plurality of video quality parameters, and to provide the plurality of scheduling policy parameters to the MAC scheduler to schedule wireless transmission of the plurality of video streams to the plurality of display devices.

6. The apparatus of claim 5 configured to cause the wireless communication device to determine the plurality of scheduling policy parameters based on a predefined video policy defining a prioritization between the plurality of video streams.

7. The apparatus of claim 6, wherein the predefined video policy comprises a uniform priority video policy, a device-based video policy, a user-defined video policy, or a resolution-based video policy.

8. The apparatus of claim 1 configured to cause the wireless communication device to receive from the MAC scheduler feedback information corresponding to the wireless transmission of the at least one video stream to the display device, to determine at least one adjusted scheduling policy parameter based at least on the feedback information, and to provide the adjusted scheduling policy parameter to the MAC scheduler.

9. The apparatus of claim 1 configured to cause the wireless communication device to classify one or more traffic inputs according to a plurality of traffic categories comprising at least a video traffic category and a non-video traffic category, and to identify the video stream to comprise a traffic input classified as the video traffic category.

10. The apparatus of claim 1 configured to cause the wireless communication device to determine the video quality parameter based on a data rate of the video stream.

11. The apparatus of claim 1 configured to cause the wireless communication device to determine the video quality parameter based on one or more attributes of a predefined number of frames of said video stream.

12. The apparatus of claim 1 configured to cause the wireless communication device to determine the video quality parameter to represent an estimated resolution of the video stream.

13. The apparatus of claim 1, wherein the scheduling policy parameter comprises a Jain Fairness Index parameter or an Access Category (AC) parameter.

14. The apparatus of claim 1 comprising an Access Point (AP), the AP comprising a network interface to receive the at least one video stream from a video provider via a communication network.

15. The apparatus of claim 1 comprising a radio to transmit the wireless transmission of the video stream, one or more antennas connected to the radio, a memory, and a processor.

16. A product comprising one or more tangible computer-readable non-transitory storage media comprising computer-executable instructions operable to, when executed by at least one processor, enable the at least one processor to cause a wireless communication device to:
   determine at least one video quality parameter representing an estimated quality of at least one video stream to be streamed via the wireless communication device to a display device over a wireless communication medium;
   determine a scheduling policy parameter based at least on the video quality parameter and on one or more screen attributes of a screen of the display device, the one or more screen attributes of the screen of the display device comprising at least one of a size of the screen of the display device, or a resolution of the screen of the display device; and
   provide the scheduling policy parameter to a Media Access Control (MAC) scheduler to schedule wireless transmission of the at least one video stream to the display device.

17. The product of claim 16, wherein the instructions, when executed, cause the wireless communication device to determine the scheduling policy parameter based on one or more wireless communication capabilities of the display device.

18. The product of claim 16, wherein the instructions, when executed, cause the wireless communication device to determine a plurality of video quality parameters for a respective plurality of video streams to be streamed to a respective plurality of display devices via the wireless communication device, to determine a plurality of scheduling policy parameters based at least on the plurality of video quality parameters, and to provide the plurality of scheduling policy parameters to the MAC scheduler to schedule wireless transmission of the plurality of video streams to the plurality of display devices.

19. The product of claim 16, wherein the instructions, when executed, cause the wireless communication device to receive from the MAC scheduler feedback information corresponding to the wireless transmission of the at least one video stream to the display device, to determine at least one adjusted scheduling policy parameter based at least on the feedback information, and to provide the adjusted scheduling policy parameter to the MAC scheduler.

20. The product of claim 16, wherein the instructions, when executed, cause the wireless communication device to determine the video quality parameter based on a data rate of the video stream.

21. An apparatus of a wireless communication device, the apparatus comprising:
   means for determining at least one video quality parameter representing an estimated quality of at least one video stream to be streamed via the wireless communication device to a display device over a wireless communication medium;
   means for determining a scheduling policy parameter based at least on the video quality parameter and on one or more screen attributes of a screen of the display device, the one or more screen attributes of the screen of the display device comprising at least one of a size of the screen of the display device, or a resolution of the screen of the display device; and
   means for providing the scheduling policy parameter to a Media Access Control (MAC) scheduler to schedule wireless transmission of the at least one video stream to the display device.

22. The apparatus of claim 21 comprising means for determining the scheduling policy parameter based on one or more wireless communication capabilities of the display device.

23. The apparatus of claim 21 comprising means for determining a plurality of video quality parameters for a respective plurality of video streams to be streamed to a respective plurality of display devices via the wireless communication device, determining a plurality of scheduling policy parameters based at least on the plurality of video quality parameters, and providing the plurality of scheduling policy parameters to the MAC scheduler to schedule wireless transmission of the plurality of video streams to the plurality of display devices.

* * * * *